Oct. 4, 1938.    A. M. SPENCER    2,132,247
AUTOMATIC FLUID PRESSURE CONTROLLER
Filed May 20, 1935
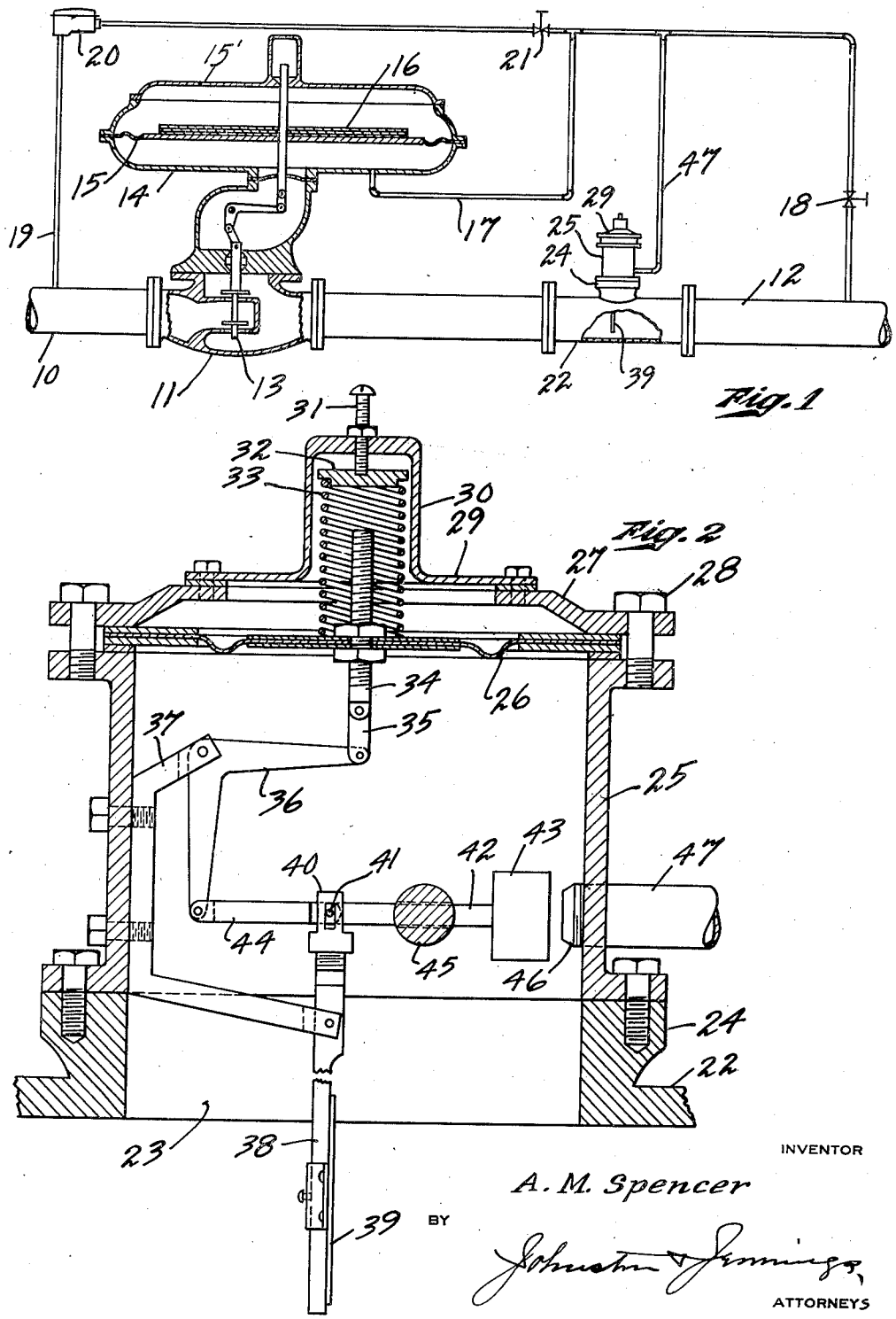
INVENTOR
A. M. Spencer
BY
Johnston Jennings
ATTORNEYS Patented Oct. 4, 1938

2,132,247

UNITED STATES PATENT OFFICE 2,132,247

AUTOMATIC FLUID PRESSURE CONTROLLER

Archie M. Spencer, Columbus, Ga.

Application May 20, 1935, Serial No. 22,393

6 Claims. (Cl. 50—16)

My invention relates to a pressure control means for fluid distribution, in which I modify the effect of a main pressure regulator, acting to deliver fluid at a reduced pressure, by means of a supplemental controller which is automatically responsive to both pressure and flow of the fluid on the low pressure side of said regulator and is adapted to cause said regulator so to increase its outlet pressure as to maintain it substantially constant during peak loads.

While my invention is generally available for the regulation of fluid in any gaseous or liquid form, it has special applicability to gas pressure regulators wherein the practice has been to use a main regulator, set for delivering a predetermined gauge pressure suitable for normal load conditions in each district, but such regulators will, under conditions of peak load, when an abnormally high rate of fluid flow prevails, allow the outlet pressure to fall sharply because incapable of responding to the resultant accelerated rate of flow induced by the increased demand.

According to my invention, when the rate of flow on the low pressure side of a pressure regulator exceeds a predetermined point, it will automatically set up a control which will cause an increase of gauge pressure while the period of high demand and accelerated rate of flow prevails.

The regulating function which I propose is best derived from a supplemental regulator means in which a controller element is interposed in the path of the fluid flow on the low pressure side so as to be influenced by its rate of flow and in responding thereto to bring an additional controlling factor into play in advance of any appreciable drop in pressure on the low pressure side, which factor will have the effect of so modifying the functioning of the main regulator as to increase its outlet pressure sufficiently to hold the pressure in the low pressure lines substantially constant and avoid all the disadvantages that inevitably follow from low pressure conditions during peak loads.

My invention further contemplates adapting the auxiliary regulator to function by regulating a restricted fluid flow through a bleeder line from the high to the low pressure side so as to discharge it at a pressure somewhat in excess of that which the main regulator is weighted to deliver. This bleeder line leads to the main pressure regulator and discharges preferably into the low pressure main through a valve which has two controlling means attached to it and working in conjunction with each other. One of these is a diaphragm operating on the valve in such a manner that if the pressure drops slightly in the low pressure main the valve opens slightly, causing the bleeder line pressure to decrease, thereby allowing the main regulator to open and build up the pressure in the low pressure main. An increase in pressure in the low pressure main will cause the bleeder line valve to close, thereby increasing pressure in the bleeder line and closing the main regulator. The other controlling means is the vane which is also attached to the bleeder valve and is affected only by the force of velocity in the low pressure main. Only when the critical velocity flow prevails in the low pressure line will the vane act and when it acts it will force the bleeder valve open, dropping the bleeder line pressure and causing the main regulator to open and deliver an increased pressure into the low pressure main.

My invention further contemplates designing the auxiliary regulator so that its velocity responsive elements and its pressure responsive elements are working in opposition, each being subject to a wide range of control, and they act jointly to move the bleeder valve and regulate pressure in the bleeder line.

My invention further comprises the novel details of construction and arrangement of parts which in their preferred embodiment only are hereinafter more particularly described and claimed, reference being had to the accompanying drawing, in which:—

Fig. 1 is a view in side elevation of a portion of a fluid distribution system with the main regulator broken away and the low pressure line broken away to indicate the velocity vane of the auxiliary regulator.

Fig. 2 is an enlarged vertical cross sectional view taken through the auxiliary regulator with the parts shown in normal operating position.

Similar reference numerals refer to similar parts throughout the drawing.

In the embodiment of my invention illustrated, I show my improved method of regulation applied to a gas distribution means comprising a high pressure line 10 connected, by means of a district regulating valve body 11, with a low pressure line 12. The balanced regulator valve 13 in the valve body 11, is controlled by a main regulator 14 having a diaphragm 15 upon which a series of weights 16 are mounted. The regulator below its diaphragm is connected by a line 17 under control of a valve 18 with the low pressure line. This main regulator is of standard construction having a vent 15' in the chamber above the diaphragm 15, and assuming valve 18 open, is designed to hold a constant gas outlet pressure which is determined by the amount of weight 16. It will however permit the outlet pressure to drop when the rate of gas flow in line 12 is abnormally high.

In order to obtain my new regulating functions in such a setting, I lead a regulating line 19 from the high pressure line 10 through a small pressure regulator 20 and past a needle valve 21 to the line 17.

I apply my auxiliary regulator to a fitting 22, interposed in the low pressure line 12 and having an opening 23 through a flanged boss or seat 24 to which the auxiliary regulator casing 25 is bolted. This casing is open below but is closed above by a diaphragm 26 held in position between a top cover 27 and the top flange of the casing by the bolts 28.

The top cover 27 has bolted thereto a cap plate 29 having a center spring guide 30 carrying a top screw 31 to adjust an upper movable seat 32 for a helical compression spring 33 which bears below on the center plate of the diaphragm 26 with a pressure regulated by the screw 31. The diaphragm 26 has adjustably connected thereto a screw 34 pivotally connected by means of a link 35 to the upper end of a bell crank 36 which in turn is pivotally mounted on the upper extension of a bracket 37 that is bolted within the casing 25. The lower extension of this bracket projects into the fitting opening 23 and has pivotally connected thereto a swinging velocity vane arm 38 which depends radially across the fitting 22 and has adjustably mounted thereon a blade or vane 39 which is normally disposed coaxially with the low pressure line. This arm 38 extends above its pivotal mounting and has its upper end threaded to receive a screw socket of a yoke 40 provided with vertical elongated slots that receive and slidably engage with a pin 41 that connects the stem 42 of the valve 43 by means of a link 44 to the lower arm of the bell crank 36.

The valve stem 42 is slidably mounted in a guide or bearing 45 suitably mounted in the casing 25 and as shown the valve is horizontally movable and adapted to seat against and close the discharge end 46 of a bleeder line 47 leading from the line 17 and opening radially through the lower side of the casing 25.

In operation, assuming the valve 18 closed, needle valve 21 open, and the small pressure regulator 20 set to deliver gas into lines 17 and 47, as a control means, under a pressure somewhat in excess of the outlet pressure which the main regulator is weighted to deliver. This gas stream passes into the bleeder line 47 from which its escape is controlled by valve 43 which thus regulates the pressure in this bleeder line and below the main diaphragm 15.

The operation of the valve 43 against the seat 46 is controlled during normal and low flows by pressure exerted under diaphragm 26. This pressure is offset by tension on the opposite side in spring 33. Slight variation in the pressure under diaphragm 26 causes a movement in valve 43. A slight decrease in pressure under diaphragm 26 will allow valve 43 to open, which will decrease the pressure in the bleeder lines 47 and 17 and allow the valve 13 to open slightly. As soon as enough gas has passed into the line 12 to increase the pressure slightly, valve 43 is closed by the slight increase under diaphragm 26. As valve 43 closes, the bleeder line pressure increases, building up pressure under diaphragm 15 of the main regulator, thereby closing valve 13 of the main regulator. This pressure control action by diaphragm 26 is a throttling action. Accurate control is effected by a combination of the amount of flow through the needle valve 21 and the tension on the spring 33. An increase in the opening or aperture at valve 21, allowing more supply into the bleeder lines 47 and 17, will cause more pressure under diaphragm 15 and close valve 13, thereby decreasing pressure in line 12 until valve 43 opens further, releasing some of the pressure in the bleeder line. A decrease in the supply through valve 21 will allow a decrease in pressure in bleeder lines 47 and 17 and under diaphragm 15 and cause valve 13 to open until pressure in line 12 is built up under diaphragm 26, closing, or partially closing, valve 43.

The action of the valve 43 at low and normal loads can be adjusted by the setting of the aperture in needle valve 21 and tension on spring 33, to cause a desired pressure to be maintained in line 12, which will very sensitively be controlled by throttling action of valve 43 against seat 46, which will vary the flow through the valve port at 46 to maintain some intermediate pressure in the bleeder line between that supplied by regulator 20 and that in line 12. At times of no flow through valve 13 the pressure under diaphragm 15 and in the bleeder line would reach the maximum delivered by regulator 20, but at times of heavy flow in line 12, the pressure in the bleeder line would approach the lower pressure in line 12.

Only when a critical rate of flow above normal prevails will it move the arm 38 and then through yoke 40 and pin 41 it will force the valve 43 from its closed position and fully open the bleeder line 47, thereby dropping its pressure to that prevailing in line 12, whereupon the weights 16 in the main diaphragm 15 will further open valve 13 so as to build up to the full pressure for which it is weighted.

The two means of control are attached to the same bleeder valve and at flows up to the point where the velocity vane takes effect, there is practically no effect from the velocity vane. It is very positive in its action, however, when velocity reaches the predetermined point for it to act. As the demand decreases below the point at which the velocity vane caused the bleeder valve to open, the force of the pressure controlling diaphragm will take effect to produce normal pressure control in the low pressure line.

Various changes may be made in parts or relation of parts so as to enable the auxiliary control to be constructed for any desired pressure to be carried at the rate of flow at which the controller will act to increase the pressure on load. Thus, the size of the auxiliary regulator diaphragm 26 may be varied; or the leverage factors provided in the transmission between the vane, diaphragm and bleeder valve; or the ratio of diaphragm to bleeder valve travel; or the size of the bleeder line outlet port 46; or the size of the velocity vane 39. By making use of one or more of the above means the effect of the vane can be varied to regulate the force for a given velocity flow exerted upon the bleeder valve to open it against the then prevailing pressure acting on diaphragm 26 to close said valve.

It will be observed that there is extremely small friction in this auxiliary regulator so that it is very sensitive and in operation it will have the very important effect of responding to the rate of flow of the fluid in the low pressure line under peak load conditions to force the main regulator to open the main pressure regulating valve sufficiently to increase the outlet pressure to a point where the distribution line pressure will be maintained high enough to avoid all of the disadvantages of, and objections to any substantial drop in distribution line pressure. Pressure readings automatically recorded on the low pressure side of my regulation system show sharp increases in pressure during peak loads and no drop in pressure below the minimum pressure required to service such distribution system. By opening valve 18, which cuts the auxiliary regulator out of service, the short readings indicated a sharp drop in pressure below said minimum which continued during the peak load periods.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. In apparatus for regulating the pressure of gas in a pressure line under variable demand, a main pressure regulator comprising a valve biased by constant pressure toward an open position and pressure actuated means comprising a diaphragm open to the atmosphere on one side for closing the valve, a by-pass line connecting the high pressure and low pressure sides of the pressure line, a connection from said by-pass to the pressure regulator to operate the pressure actuated means thereof, a throttling device in the by-pass between the latter connection and the by-pass connection to the high pressure side of the pressure line, a quick acting valve means beyond the throttling device for varying the pressure in the by-pass line, a pivoted vane in the pressure line on the low pressure side of the main pressure regulator adapted to move responsive to flow conditions in the pressure line, and a connection between the vane and the last mentioned valve means to operate the latter.

2. In apparatus for regulating the pressure of gas in a pressure line under variable demand, a main pressure regulator comprising a valve biased by constant pressure toward an open position and pressure actuated means comprising a diaphragm open to the atmosphere on one side for closing the valve, a by-pass line connecting the high pressure and low pressure sides of the pressure line, a connection from said by-pass to the pressure regulator to operate the pressure actuated means thereof, a throttling device in the by-pass between the latter connection and the by-pass connection to the high pressure side of the pressure line, a quick acting valve means for controlling the pressure in the by-pass line between the throttling device and the connection to the low pressure side of the pressure line, and means consisting of a pivoted vane connected with said last mentioned valve means jointly responsive to pressure in the low pressure side of the pressure line and to rate of flow therein for opening and closing said latter valve means.

3. In apparatus for regulating the pressure of gas in a pressure line under variable demand, a main pressure regulator comprising a valve biased by constant pressure toward an open position and pressure actuated means comprising a diaphragm open to the atmosphere on one side for closing the valve, a by-pass line connecting the high pressure and low pressure sides of the pressure line, a connection from said by-pass to the pressure regulator to operate the pressure actuated means thereof, a throttling device in the by-pass between the latter connection and the by-pass connection to the high pressure side of the pressure line, and means comprising a pivoted vane responsive to rate of flow in the pressure line for opening and closing said valve.

4. In apparatus for controlling the pressure of gas in a pressure line under variable demand, a main regulator including a main valve biased by constant pressure toward open position, pressure operated means comprising a diaphragm open to the atmosphere on one side for moving the main valve to a closed position against the force of the biasing means, a by-pass connected to the pressure line from the high pressure side to the low pressure side of the pressure regulator, means for throttling the flow of gas through the by-pass, a connection from said by-pass beyond the throttling means to the pressure operated means of the main regulator, a quick opening valve means for controlling the flow of gas from the by-pass to the low pressure side of the pressure line, and means comprising a pivoted vane connected with said last mentioned valve responsive to flow conditions in the pressure line for controlling the position of said latter valve means.

5. In apparatus for controlling the pressure of gas responsive to fluctuating demand, a pressure line, a main valve controlling the flow therethrough, constant pressure means for biasing the main valve to an open position, a by-pass conduit connected to the pressure line around the main valve, pressure reducing means in said by-pass, a throttling device in said by-pass between the pressure reducing means and the connection to the low pressure side of the pressure line, pressure operated means comprising a diaphragm open to the atmosphere on one side for closing the main valve in opposition to the biasing means, a conduit connecting the pressure operated means and the by-pass between the throttling means and the connection to the low pressure side of the pressure line, a quick acting valve means controlling the flow from the by-pass to the low pressure side of the pressure line, and means comprising a pivoted vane connected with said last mentioned valve responsive to flow in the pressure line for operating said latter valve means.

6. In apparatus for controlling the pressure of gas responsive to fluctuating demand, a pressure line, a main valve controlling the flow therethrough, means for biasing the main valve to an open position, a by-pass conduit connected to the supply conduit around the main valve, pressure reducing means in said by-pass, a throttling device in said by-pass between the pressure reducing means and the connection to the low pressure side of the pressure line, pressure operated means comprising a diaphragm open on one side to the atmosphere for closing the main valve in opposition to the biasing means, a conduit to the pressure operated means from the by-pass between the throttling means and the connection to the low pressure side of the pressure line, a quick opening valve means for controlling the flow from the by-pass to the low pressure side of the pressure line, means responsive to pressure in the low pressure side for controlling said latter valve means under minimum flow conditions, and means consisting of a pivoted vane connected with said latter valve means responsive to flow for opening said valve upon an increase of flow in the pressure line, whereby under increased flow conditions to connect the pressure operated means associated with the main valve directly to the low pressure side of the pressure line.

ARCHIE M. SPENCER.